T. V. BUCKWALTER.
BATTERY TRANSFER MECHANISM.
APPLICATION FILED DEC. 9, 1909.

969,154.

Patented Sept. 6, 1910.

WITNESSES:

INVENTOR

BY

ATTORNEY.

UNITED STATES PATENT OFFICE.

TRACY V. BUCKWALTER, OF ALTOONA, PENNSYLVANIA.

BATTERY-TRANSFER MECHANISM.

969,154.  Specification of Letters Patent.  Patented Sept. 6, 1910.

Application filed December 9, 1909. Serial No. 532,206.

*To all whom it may concern:*

Be it known that I, TRACY V. BUCKWALTER, a citizen of the United States, residing at Altoona, in the county of Blair and State of Pennsylvania, have invented certain Improvements in Battery - Transfer Mechanism, of which the following is a specification.

My invention is an improved mechanism for transferring batteries, particularly those used for propelling vehicles, wherein peculiar means for suspending batteries coöperate with peculiar means for removing and replacing them.

The features characteristic of my improvements are disclosed in the following description and the accompanying drawings in illustration thereof.

Figure 1:
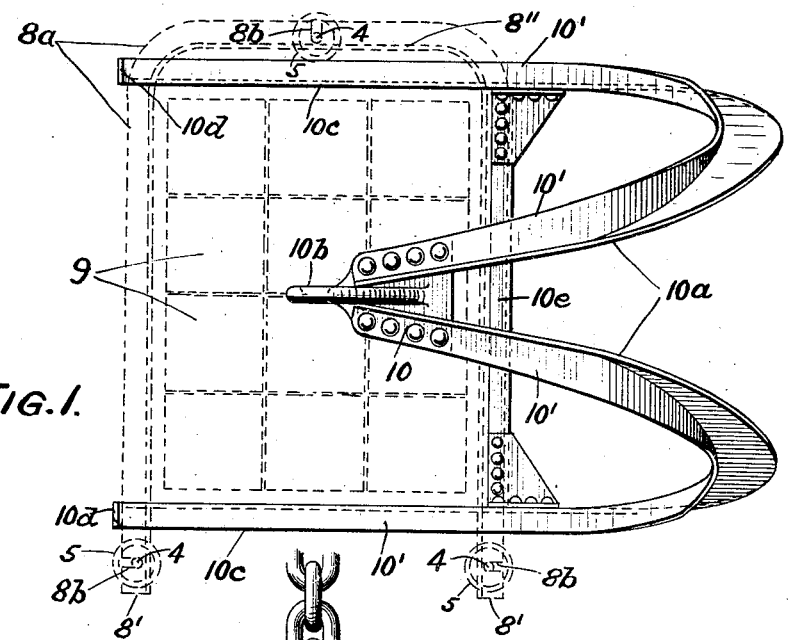
Figure 2:
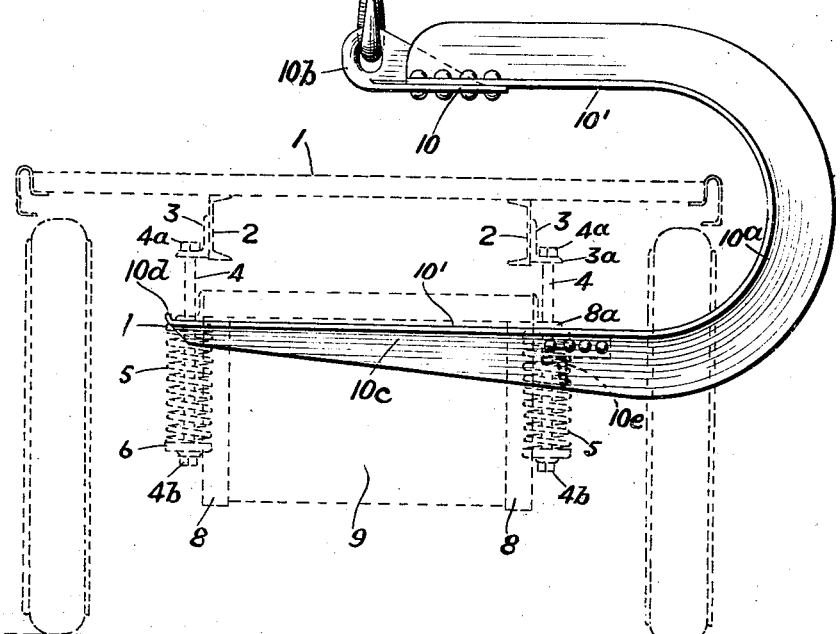

In the drawings, Figure 1 is a plan view of mechanism embodying my invention, and Fig. 2 is an end view of a motor truck and battery with my improved mechanism applied thereto.

The construction shown in the drawings comprises a truck platform 1 supported upon the channels 2 having the angles 3 fixed thereto. Bolts 4 pass through the horizontally disposed flanges or legs 3ª of the angles and have their heads 4ª engaged thereby. Coiled springs 5, sleeved on the bolts, are supported by the nuts 4ᵇ engaging the bolts and the washers 6 thereon, the springs supporting the washers 7 on the bolts.

A frame 8, for carrying the battery 9, has at its top a U-shaped member comprising the parallel parts 8' and the transverse part 8", these parts projecting beyond the ends of the frame proper required for incasing the battery. The parts 8' and 8" have the horizontally and outwardly extending legs or flanges 8ª containing the outwardly opening notches 8ᵇ adapted for receiving the bolts 4. The bolts swing in their respective bearings in the flanges 3ª to effect this engagement, as well as to permit disengagement of the flanges, which rest normally on the parts 7 to effect the suspension of the battery by the bolts through the springs 5.

A yoke 10 is formed by bending angle irons (so that a flange 10' thereof extends horizontally) to form bows having the parts 10ª diverging from a connection with an eye 10ᵇ and the parallel arms 10ᶜ, the arms being braced by a cross piece 10ᵉ and having the upturned terminals 10ᵈ. The yoke is suspended by a hoist or crane chain 11 which engages the eye 10ᵇ.

The arms 10ᶜ are adapted to pass the opposite ends of the frame proper, under the extensions 8' and 8" thereof, the cross bar 10ᵉ passing under the flange 8ª in proximity thereto and the upturned terminals 10ᵈ lying in the plane of and beyond the flange 8ª in proximity thereto. The construction is such that the eye 10ᵇ is approximately in the line of the center of gravity of the battery when the frame is thus engaged by the yoke.

The battery is removed from its connections with its hangers by lifting the chain 11 and the yoke 10, thus lifting the frame containing the battery, whereupon the hangers comprising the bolts 4 are swung outwardly to disengage the frame from the truck. The battery is then removed by moving the frame transversely to the truck, and it is replaced by a reversal of these operations.

Having thus described my invention, I claim:

1. In a battery transfer mechanism, the combination of a battery frame having oppositely extending members projecting from ends thereof,—with a yoke having arms which are adapted for engaging said projections.

2. In a battery transfer mechanism, a frame having a substantially U-shaped member at the top thereof, said member having parts projecting beyond the ends proper of the frame required for holding the battery.

3. In a battery transfer mechanism, a frame having a member provided with an outwardly extending flange containing an outwardly opening slot, in combination with a suspending member passing through said slot and means carried by said member upon which said flange rests.

4. In a battery transfer mechanism, a frame having projecting parts respectively comprising an outwardly extending flange containing an outwardly extending slot, suspending members passing through the respective slots, and a yoke adapted for engaging said projecting parts.

5. In a battery transfer mechanism, a yoke comprising a pair of bows having members diverging from a connection and substantially parallel members extending oppositely to the direction of said members first named, in combination with a battery frame having members adapted for the engagement of said bows.

6. In a battery transfer mechanism, a frame having projecting end members, in combination with a yoke comprising bows having members extending from a supporting connection and members extending oppositely thereto and adapted for engaging said end members.

7. In a battery transfer mechanism a yoke comprising angle irons each bent to the form of a bow with substantially parallel members having laterally extending flanges, in combination with a battery frame having members adapted for the engagement of said parallel members.

In witness whereof I have hereunto set my name this 3rd day of December, 1909, in the presence of the subscribing witnesses.

TRACY V. BUCKWALTER.

Witnesses:
ROBERT JAMES EARLEY,
JOS. G. DENNY, Jr.